Patented June 10, 1941

2,244,849

UNITED STATES PATENT OFFICE 2,244,849

MANUFACTURE OF POLYCARBOXYLIC ACIDS

John F. Olin, Grosse Ile, Mich., assignor to The Sharples Solvents Corporation, Philadelphia, Pa., a corporation of Delaware No Drawing. Application May 13, 1939, Serial No. 273,481

4 Claims. (Cl. 260—537)

The present invention relates to the manufacture of polycarboxylic acids, such as adipic acid, glutaric acid, methyladipic acid, and acids of similar character. These acids have heretofore been produced by oxidation of cyclo-aliphatic alcohols. In the manufacture of adipic acid, for example, phenol has been hydrogenated to produce cyclohexanol, which has been oxidized by treatment with nitric acid or other oxidizing agents to produce the desired acid. While adipic acid may be made in good yield by this process, the process involves use of phenol as a starting material, and the cost of this material necessarily makes the whole process relatively expensive. An object of the present invention has been to manufacture acids of this character by a process in which cyclo-paraffins instead of phenol may be used as starting materials, thereby utilizing a cheaper source of raw material and rendering the entire process more economical.

Another object of the invention has been to provide an economical method of producing cyclo-aliphatic alcohols by using a cyclo-aliphatic paraffin or a cyclo-aliphatic olefin as the source of the cyclohexyl radical of the alcohols. Still further objects of the invention, and the manner in which they have been attained, will be obvious from a reading of the following specification.

While various cyclo-aliphatic alcohols and various carboxylic acids can be produced by the process of the invention, the process of producing cyclohexanol and adipic acid will be first explained, for the sake of simplicity of description.

While the invention is not limited to the utilization of cyclohexane or cyclohexene from any particular source, these materials may be obtained directly from petroleum sources, or cyclohexane may be produced by hydrogenation of benzene in known manner.

In case cyclohexane is used as a starting material, this material may first be halogenated, as, for example, by chlorination to produce the corresponding cyclohexyl chloride. This chlorination reaction may be accomplished either in the liquid or vapor phase, and involves treatment of the cyclohexane with considerably less than a molecular equivalent of chlorine. If the cyclohexane is chlorinated in this manner, a mixture consisting substantially entirely of cyclohexyl mono-chloride and cyclohexane is obtained.

The cyclohexyl chloride so formed, or the mixture of cyclohexyl chloride and cyclohexane, is next subjected to a splitting reaction to convert the cyclohexyl chloride to cyclohexene, with the evolution of hydrogen chloride. The splitting reaction may be accomplished in any one of a number of ways, as, for example, by passing the mixture through a heated zone which may contain a catalyst facilitating the splitting reaction, by refluxing cyclohexyl chloride with catalysts promoting the splitting reaction, such as chlorides of various metals, e. g., ferric chloride, or by heating the cyclohexyl chloride with organic bases, such as quinoline. It may be accomplished by heating the cyclohexyl chloride with either an anhydrous base or an aqueous solution of a suitable alkaline material, such as lime, caustic soda or sodium carbonate. In case aqueous alkaline solutions are used for accomplishing this splitting reaction as described above, a certain amount of cyclohexanol will be produced during the course of the splitting reaction.

The cyclohexene resulting from the practice of the splitting reaction, which may contain varying amounts of cyclohexane, depending upon whether the crude chlorinated material has been purified by distillation, is next hydrated to convert the cyclohexene into cyclohexanol. This may be accomplished, for example, by sulfating the mixture with sulfuric acid of appropriate concentration (66 to 85%). In case a mixture of cyclohexane and cyclohexene is produced by the sequence of steps involving chlorinating and splitting, and the cyclohexane is retained in the resulting mixture as a diluent during the ensuing sulfation step, the cyclohexane may be separated by subsidence from the resulting sulfation mixture and re-used in the performance of the chlorination step upon a subsequent batch of cyclohexane.

The mixture of cyclohexyl sulfate and cyclohexyl hydrogen sulfate produced by the sulfation step is next converted into cyclohexanol by hydrolysis. The step of hydrolysis may be accomplished by diluting the sulfated mixture with approximately four times its volume of water, and wet distilling the product so obtained.

As pointed out above, when cyclohexyl chloride is treated with an aqueous solution of an alkaline compound such as lime, caustic soda or sodium carbonate, a considerable yield of alcohol is obtained in connection with the splitting step so accomplished. When this method of splitting is adopted, it will be desirable to distill the material resulting from the splitting operation before proceeding with the ensuing steps of the process. The cyclohexanol so obtained will thus be separately collected. The cyclohexene, or mixture of cyclohexene with cyclohexane, obtained from the splitting reaction will then be subjected to sulfation as described above, any cyclohexane removed after the performance of the sulfating step being returned to the initial chlorinating step of the process, and the sulfated mixture being subjected to hydrolysis as described above. The cyclohexanol formed by direct hydrolysis in connection with the splitting reaction may then be combined with the cyclohexanol formed by hydrolysis of the sulfated mixture for subsequent oxidation to produce polycarboxylic acids.

Instead of hydrating cyclohexene produced in any of the manners described above by sulfation and hydrolysis, the hydration of the cyclohexene may be accomplished by heating this material under pressure with salts of strong acids and weak bases in aqueous solution. Thus, the cyclohexene may be heated to a temperature of 150° C. in an autoclave with an aqueous solution of quinoline sulfate to yield cyclohexanol.

As a still further alternative, the cyclohexene may be treated at elevated temperatures with dilute aqueous solutions of acids, such as oxalic acid, phosphoric acid, sulfuric acid, etc., to produce the desired cyclohexanol.

As a still further alternative, the cyclohexene may be passed over an acid catalyst (e. g., phosphoric acid deposited on silica gel) in the presence of steam at elevated temperatures and pressures to produce the desired cyclohexanol.

In the manufacture of poly-carboxylic acids, such as adipic acid, the cyclohexanol may be treated with a mixture of nitric acid of appropriate concentration (e. g. 50%), which may also contain an oxidation catalyst such as vanadic acid, manganese, chromium, cerium, lead, cobalt, iron, copper, nickel, vanadium, tungsten, or compounds of any of these metals, such as the nitrates, oxides, or sulfates thereof. The nitric acid solution used to accomplish this oxidation may vary in concentration between 40 and 60%, or even within a somewhat wider range. The oxidation is best accomplished at temperatures between 40 and 70° C., and the temperature is preferably maintained between 55 and 60° C. until the reaction is substantially complete, after which it may be allowed to rise to 65° C. toward the conclusion of the oxidation reaction. The reaction mixture is chilled to a temperature between —5° and +5° C. and filtered. The filter cake may then be washed with ice water, pressed, and allowed to dry, to obtain the desired white crystalline adipic acid.

In cases in which oxidation catalysts, such as ammonium vanadate are used in the oxidation of the cyclohexanol to produce adipic acid, slightly lower temperatures than those indicated above may be employed.

Instead of proceeding, as described above, to produce adipic acid from cyclohexanol by oxidation, the cyclohexanol may first be catalytically dehydrogenated to produce cyclohexanone, and the cyclohexanone may then be oxidized to produce adipic acid by oxidation with nitric acid as described above, or it may be oxidized by exposure to sunlight in the presence of water. This oxidation of cyclohexanone may also be accomplished in the manner described in U. S. Patent 2,005,183, by treatment with oxygen and glacial acetic acid in the presence of manganese acetate as a catalyst.

*Example 1*

7300 pounds of cyclohexane is placed in a 1500 gallon glass lined kettle attached to an efficient reflux condenser connected to a scrubber for removing hydrogen chloride. The material is heated until reflux begins, and a flow of chlorine gas is then started into the boiling liquid by means of a distributor. After chlorination has begun, the heat of reaction is sufficient to maintain reflux throughout the run, and external heating is therefore discontinued. Chlorination is continued until 1420 pounds of chlorine has been passed into the cyclohexane. The product is then transferred to a glass lined still to which is attached a glass lined column packed with carbon Raschig rings. The unchanged cyclohexane is distilled off, and 2040 pounds of cyclohexyl chloride, boiling between 42 and 50° C. at 24 mm. pressure and having a specific gravity of 0.998 at 20° C. are obtained. The residue of this distillation consists of dichlor-cyclohexane. In the above chlorination, it should be observed that steel apparatus should not be used, since the use of steel apparatus causes catalytic decomposition of the cyclohexyl chloride. Glass lined apparatus is most satisfactory, although certain alloys and nickel lined apparatus may be employed. Alternatively, the cyclohexane may be chlorinated in vapor phase by a process such as that of the patent to E. E. Ayres, 1,717,136.

1185 pounds of cyclohexyl chloride, produced as described above, are mixed with 435 pounds of calcium hydroxide and 750 gallons of water in an autoclave equipped with a very efficient agitator. The mass is vigorously stirred and heated for four hours at a temperature of 140° C., and the temperature is then raised to 180° C. and maintained at that point for two more hours. The pressure during the course of the run varies from 75 pounds to 250 pounds per square inch. When the reaction is complete, the contents of the autoclave are discharged to a still, where the organic contents of the mass are removed by distillation and decantation. The mixture of cyclohexene and cyclohexanol is fractionated and in this manner approximately 527 pounds of cyclohexene and 348 pounds of cyclohexanol are obtained. The cyclohexene is then sulfated by treatment with sulfuric acid of 73% concentration. (Acid of lower concentration may be employed as indicated above, but the use of acid of lower concentration results in slow reaction. If acid of substantially higher strength than 73% is used, a polymerization inhibitor, such as ferricyanic acid should be added in order to prevent excessive polymerization.)

250 gallons of cyclohexene and 250 gallons of 73% sulfuric acid are charged into a lead lined, water-jacketed reactor, cold brine is run through the jacket until the temperature is reduced to between 4 and 8° C., and the material is maintained at that temperature for a period of one hour. The mass is then allowed to warm up until it reaches 20° C., and it is maintained at that temperature for an additional ½ hour. The material is then stirred for one hour at 30° C. At the end of this reaction period, the mixture is transferred to a lead lined still where it is diluted with approximately four times its volume of water. The material is then distilled and two rough cuts are taken. The first of these cuts boils below 85° C., and consists of cyclohexene and water. The second cut boils between 85 and 99° C. and consists of a constant boiling mixture of cyclohexanol and water. The recovered cyclohexene is returned to storage for subsequent treatment to produce cyclohexyl sulfates, while the cyclohexanol is dehydrated by distillation and fractionally distilled. In this manner, about 1236 pounds of pure cyclohexanol is obtained.

162 gallons of 50% nitric acid is placed in a kettle equipped with an agitator and made of 18/8 stainless steel modified with molybdenum. An efficient reflux condenser is attached to this vessel and a scrubber system is attached to the end of the reflux condenser for the recovery of oxides of nitrogen. The mass of nitric acid is now heated to approximately the boiling point and about one quart of cyclohexanol is added. After the addition of the cyclohexanol is completed, reaction begins with the evolution of oxides of nitrogen. Cooling water is then passed through the jacket of the vessel until a temperature of 60° C. has been reached. The temperature is maintained at a point between 55 and 60° C. during the addition of 66.2 gallons of cyclohexanol as rapidly as reaction will permit. Toward the end of the reaction, the temperature is allowed to rise to 65° C. After the completion of the addition of cyclohexanol, the material is stirred for a period of ½ hour and then evaporated at 50 mm. absolute pressure to a volume of about 125 gallons. The product is then chilled to 8° C. and filtered. The filter cake is washed with 50 gallons of ice water, pressed, and allowed to dry. In this manner, approximately 465 pounds of white crystalline adipic acid is obtained.

*Example 2*

6720 pounds of cyclohexane are chlorinated with 2840 pounds of chlorine by the procedure described in Example 1. The mixture of cyclohexyl chloride and cyclohexane produced in this manner is transferred to an autoclave where it is reacted with 900 lbs. of calcium hydroxide in 900 gallons of water, in the manner described in Example 1. When the reaction is completed the contents of the autoclave are transferred to a still by means of which the organic content of the charge is removed by distillation and decantation. Without separation of the cyclohexene and cyclohexane from the cyclohexanol, the crude product is transferred to a lead-lined, water-jacketed reactor where it is treated with 800 gallons of 74% sulfuric acid. Maintaining highly efficient agitation, the reaction mixture is maintained at approximately 5° C. for a period of one hour. The mass is then allowed to warm to a temperature of 25° C. while stirring is continued for two additional hours. When the agitator is turned off a separation into two layers will be obtained, the top layer consisting essentially of unchanged cyclohexane while the lower layer is a mixture of dicyclohexyl sulfate and cyclohexyl hydrogen sulfate, formed by reaction of sulfuric acid with the cyclohexene and the cyclohexanol. These layers are separated, the top layer being returned for re-use while the bottom layer is transferred to a lead-lined still where it is diluted with approximately four times its volume of water. Upon distillation a small amount of cyclohexene and cyclohexane are obtained at approximately 72° C. The temperature then rapidly rises to 98° where the constant boiling mixture of alcohol and water distills. The two layers, cyclohexanol and water, are separated by decantation, the cyclohexanol layer being passed to a receiver while the water, saturated with cyclohexanol, is returned to the still. The crude, wet cyclohexanol may then be oxidized to adipic acid as in Example 1.

While the invention has been described above with specific reference to the manufacture of adipic acid, it will be evident that the fundamental technique of the invention may be employed in the manufacture of other acids than adipic acid and in the manufacture of other alcohols than cyclohexanol. Thus, for example, the process of the invention may be employed to produce glutaric acid from cyclo-pentane or cyclopentene by the general sequence of steps described above, it may be employed to produce methyl adipic acid by the treatment of methyl cyclohexane or methyl cyclohexene and it may be employed to produce alkyl-substituted adipic acids in general by a similar technique employing alkyl-substituted-cyclohexanes or cyclohexenes as starting materials.

Similarly, the process described above for the production of cyclohexanol may be employed to produce other cyclo-aliphatic alcohols, such as cyclo-pentanol.

Still further modifications will be obvious to those skilled in the art and I do not therefore wish to be limited except by the scope of the subjoined claims.

I claim:

1. In the manufacture of adipic acid, the process comprising, halogenating cyclo-hexane to produce cyclo-hexyl mono-halide, splitting the resulting halide to produce cyclohexene, hydrating the resulting cyclohexene to produce cyclohexanol and oxidizing the resulting cyclohexanol.

2. In the manufacture of adipic acid, the process comprising, halogenating cyclo-hexane with an amount of halogen comprising considerably less than the molecular equivalent of the cyclohexane treated, splitting the resulting mixture of cyclohexane and cyclohexyl mono-halide to produce a mixture of cyclohexene and cyclohexane, sulfating the mixture so produced, separating the cyclohexane from the sulfated mixture, hydrolyzing the remaining sulfated mixture to produce cyclohexanol and oxidizing the resulting cyclohexanol.

3. In the manufacture of adipic acid, the process comprising, halogenating cyclohexane to produce cyclohexyl mono-halide, splitting the resulting halide to produce cyclohexene, sulfating the resulting cyclohexene, hydrolyzing the resulting cyclohexyl sulfate, and oxidizing the cyclohexanol produced by said hydrolyzing step.

4. In the manufacture of adipic acid, the process comprising, sulphating cyclo-hexene, hydrolyzing the sulphated produce to produce cyclohexanol, and oxidizing the resulting cyclohexanol.

JOHN F. OLIN.

CERTIFICATE OF CORRECTION.

Patent No. 2,244,849.                                              June 10, 1941.

JOHN F. OLIN.

It is hereby certified that error appears in the printed specification of the above numbered patent requiring correction as follows: Page 3, second column, line 62-63, claim 4, for "proccess" read --process--; line 64, same claim, for "produce to produce" read --product to produce--; and that the said Letters Patent should be read with this correction therein that the same may conform to the record of the case in the Patent Office.

Signed and sealed this 9th day of September, A. D. 1941.

(Seal)                                                               Henry Van Arsdale,
Acting Commissioner of Patents.